R. M. CLARK.
Device for Destroying Bugs Upon Plants.
No. 166,260.
Patented Aug. 3, 1875.
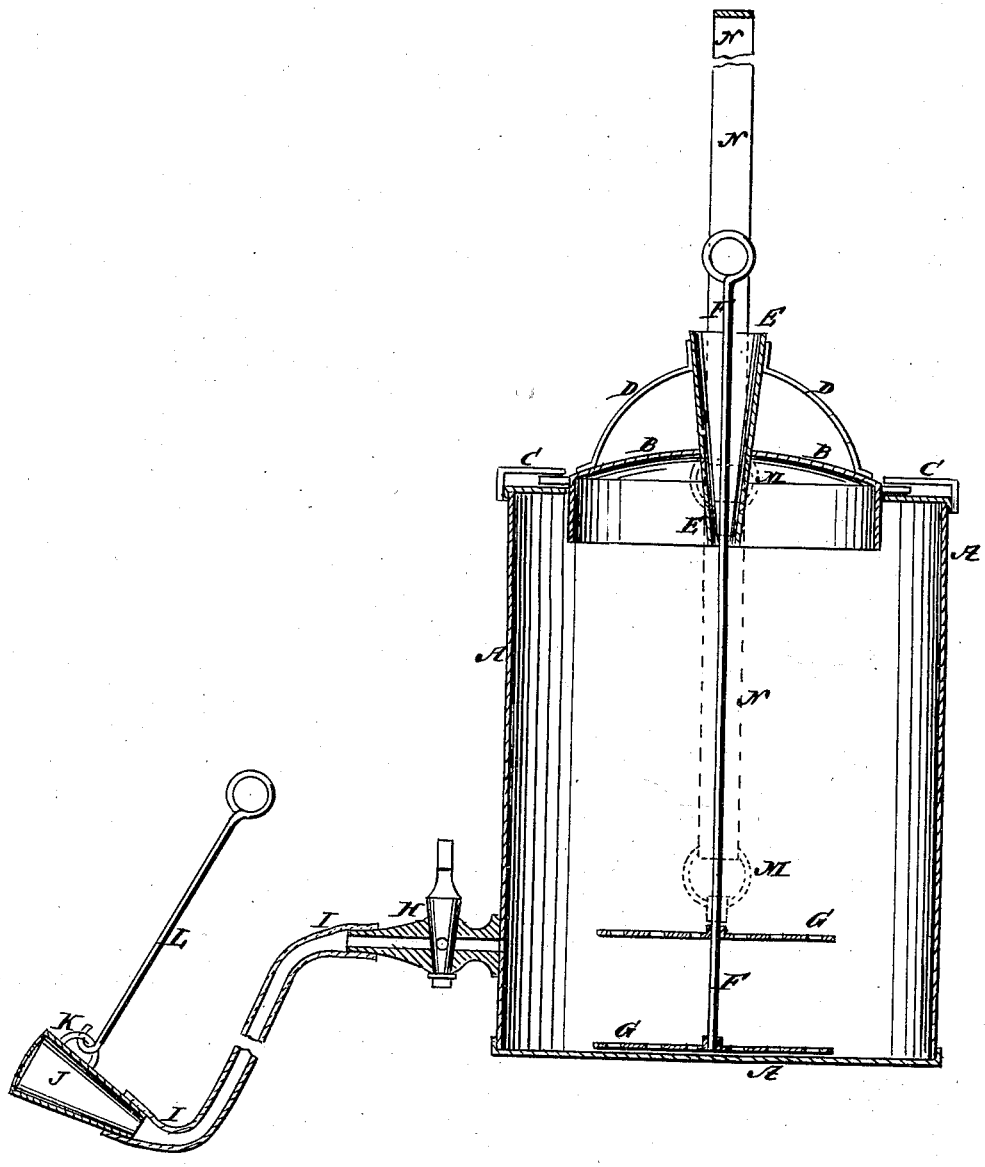
WITNESSES:
INVENTOR: Robert M. Clark
BY
ATTORNEYS.

UNITED STATES PATENT OFFICE.

ROBERT M. CLARK, OF NISBET, PENNSYLVANIA.

IMPROVEMENT IN DEVICES FOR DESTROYING BUGS UPON PLANTS.

Specification forming part of Letters Patent No. 166,260, dated August 3, 1875; application filed June 26, 1875.

*To all whom it may concern:*

Be it known that I, ROBERT M. CLARK, of Nisbet, in the county of Lycoming and State of Pennsylvania, have invented a new and useful Improvement in Device for Destroying Bugs upon Plants, of which the following is a specification:

The figure is a detail vertical section of my improved device.

The object of this invention is to furnish a simple and convenient device for sprinkling plants with poison, to destroy the bugs and insects that may be upon them.

The invention consists in the combination of the vessel, the cover provided with the arched handle and the funnel, the dasher, the faucet, the rubber tube, and the flaring nozzle with each other.

A is a vessel of any convenient size, and which is provided with a cover, B. The flange of the cover is notched to allow it to pass down over the clamps C, attached to the upper edge of the vessel A, so that the said cover may be secured in place by turning it so as to bring its flange beneath the said clamps C. To the upper side of the cover B is attached a curved or arched handle, D, through a hole in the center of which, and through a hole in the center of the cover B, passes a tapering or funnel-shaped tube, E, which is firmly secured to said handle and cover, and through which passes the rod F. To the upper end of the rod F is attached, or upon it is formed, a handle, and to its lower end, at a little distance apart, are attached two perforated disks, G. To the lower part of the side of the vessel A is secured a faucet, H, to the spout of which is secured the end of a short rubber tube, I. To the outer end of the rubber tube I is attached a flaring nozzle, J, the outer end of which is covered with a finely-perforated cap-plate. To the side of the nozzle J is attached a loop, K, to receive the hook formed upon the end of the rod L, for convenience in guiding the nozzle J, so as to discharge the poison upon any desired part of the plants. To the sides of the vessel A are attached rings M, to receive a strap, N, so that the device may be carried upon the shoulder of the operator, so that the poison may flow out through the tube I. In using the device, paris-green or other suitable poison is put into the vessel A, either by taking off the cover B or by pouring it in through the funnel E. A suitable quantity of water is then poured into the vessel A through the funnel E, in which may be placed a sponge or other suitable filter in case the water be so dirty that it would clog the nozzle J. The poison and water are mixed by operating the dasher F G, and are kept mixed by occasionally operating said dasher. The faucet H enables the escape of the poison to be prevented when charging the vessel A, and when carrying it from place to place.

Having thus described my invention, I claim as new and desire to secure by Letters Patent—

The combination of the vessel A, the cover B, provided with the arched handle D and funnel E, the dasher F G, the faucet H, the rubber tube I, and the flaring nozzle J, with each other, substantially as herein shown and described.

ROBERT M. CLARK.

Witnesses:
 THOS. O. SIMPSON,
 JOHN BIRD.